United States Patent [19]

Inoue

[11] 3,927,416
[45] Dec. 16, 1975

[54] SHUTTER FOR CAMERAS

[75] Inventor: Nobuyoshi Inoue, Kawagoe, Japan

[73] Assignee: Copal Company Limited, Tokyo, Japan

[22] Filed: May 3, 1974

[21] Appl. No.: 466,893

[30] Foreign Application Priority Data
May 9, 1973 Japan............................ 48-51436

[52] U.S. Cl. ................. 354/235; 354/48; 354/266
[51] Int. Cl.² ..................... G03B 9/08; G03B 17/18
[58] Field of Search .......... 354/24, 48, 50, 57, 234, 354/235, 266, 267

[56] References Cited
UNITED STATES PATENTS

| | | | |
|---|---|---|---|
| 3,670,635 | 6/1972 | Ort........................................ | 354/50 |
| 3,777,646 | 12/1973 | Shimizu ............................. | 354/235 |

*Primary Examiner*—Joseph F. Peters, Jr.
*Attorney, Agent, or Firm*—Cushman, Darby & Cushman

[57] ABSTRACT

An electronic shutter for cameras comprising a control lever actuated by a shutter release, a signaling lever moved by the actuated control lever, and a mechanical exposure control lever adapted to function so that, when said signaling lever is put into motion, this exposure control lever moves due to its own habitude to the position of locking a magnet lever, so that, whenever the voltage of the battery has dropped below a given level and when accordingly the automatic exposure control circuitry has ceased to work, an exposure can be carried out without a fail and with accuracy at a given specific shutter speed selected already in designing this shutter.

1 Claim, 4 Drawing Figures

SHUTTER FOR CAMERAS

BACKGROUND OF THE INVENTION

1. Field of the invention

The present invention pertains to an electronic shutter for cameras, and more particularly it relates to an electronic shutter arranged to function so that, whenever the voltage of the battery has dropped below a given level and when, accordingly, the automatic exposure control circuitry has ceased to work, an exposure can be carried out automatically at a given specific shutter speed selected already in designing this shutter.

2. Description of the prior art

There have been known various kinds of electronic shutters which are arranged so that the shutter blades are caused to close by an electromagnet which is controlled of its energizing time by an automatic exposure time control circuit. These known electronic shutters, however, had the disadvantage in general that, when the voltage of the battery has dropped below a given level, the automatic exposure time control circuit is stripped of its normal function, so that there can no longer be obtained a photograph of a proper exposure corresponding exactly to the brightness of the object to be photographed.

In order to eliminate this drawback of the electronic shutters of the prior art, there have been proposed electronic shutters which are arranged so that, when the voltage of the battery has dropped below a certain level, an exposure can be carried out at a given shutter speed and which are provided with an indicator for signaling this fact of having completed this exposure to the photographer.

However, known shutters possessing the aforesaid function had the drawbacks that, owing to the arrangement that the mechanism for obtaining a specific shutter speed and the aforesaid indicator are provided independently of each other, the shutter as a whole required a large number of its component parts and that its structure was complicated. Also, the known mechanism for obtaining a specific shutter speed has been arranged so that a magnet lever for causing a closing motion of the shutter blades is locked by making use of the frictional force exerted by a mechanical exposure control member which normally is urged to retreat from the region of movement of said magnet lever and that this state of locking is released in the final stage of movement of a driving member assigned to cause the opening of the shutter blades. For this reason, according to the known mechanism the magnet lever was not locked in a stable manner such that, owing to the vibrations accruing from the motions of the various internal mechanisms of the camera, or to impacts given externally of the camera or to like reasons, the magnet lever was relieved of its locked state earlier than the intended time, causing the rear blades to start their closing motion before the front blades were opened, with a result virtually the same as that of the instance where the shutter did not open at all.

SUMMARY OF THE INVENTION

It is, therefore, a primary object of the present invention to provide an electronic shutter for cameras, which is arranged so that the magnet lever is locked by a mechanical exposure control lever which is urged to be able to enter in the path of motion of the magnet lever, whereby when the voltage of the battery has dropped below a certain level and when, accordingly, the automatic exposure control circuit has ceased to work, an exposure is insured with accuracy at specific shutter speed selected preliminarily in designing this shutter.

Another object of the present invention is to provide an electronic shutter for cameras, which is arranged so that a control mechanism for causing an exposure to be carried out at a specific shutter speed selected priorly in designing this shutter is operatively combined with an indicator for giving out a signal of the fact that an exposure was carried out at said specific shutter speed, whereby reducing the number of the component parts, and at the same time simplifying the construction of the shutter as a whole.

DETAILED DESCRIPTION OF THE PREFERRED EMBODIMENT

Figure 1:
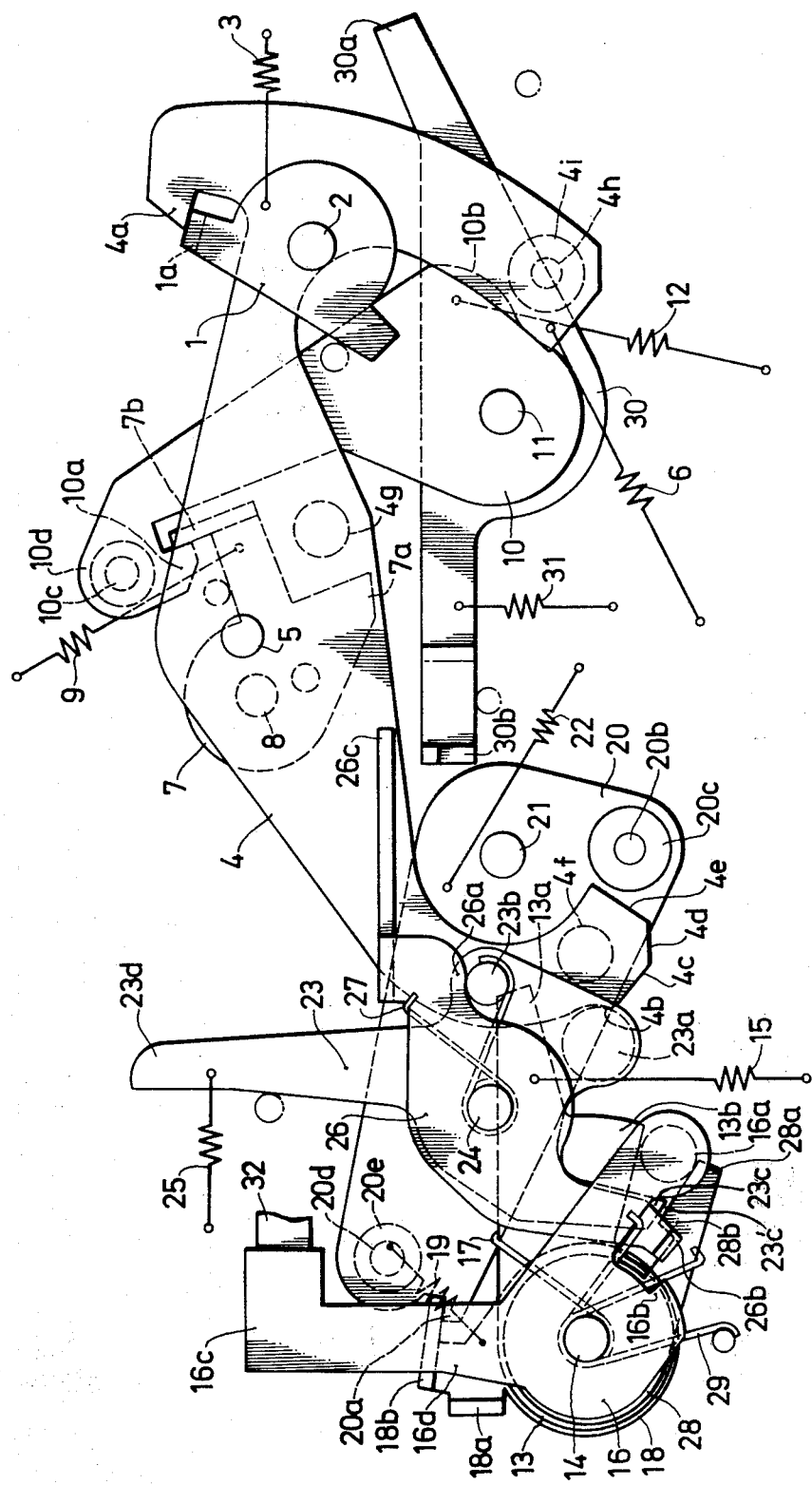
FIG. 1 is a plan view of the essential portion of the shutter mechanism according to the present invention, showing its state of being cocked.

Referring now to the drawings, reference numeral 1 represents a release plate which is mounted on a shaft 2 and is urged to rotate clockwise by a spring 3. This release plate has a bent portion 1a as shown. Numeral 4 represents a control lever mounted on a shaft 5 and urged to rotate clockwise by spring 6. This control lever 4 has a hook 4a which engages said bent portion 1a and also has a cam surface 4b, an outer peripheral surface 4c, an inclined surface 4d and an end surface 4e, and further has, extending from its surface, pins 4f and 4g, and a shaft 4h which supports a roller 4i. Numeral 7 represents a front blade release lever which is mounted on a shaft 8 and is urged to rotate counter-clockwise by a spring 9. This lever 7 has an arm 7a which is urged by said pin 4g and has a bent portion 7b. Numeral 10 represents a front blade driving lever which is mounted on a shaft 11 and is urged to rotate clockwise by a spring 12. This lever 10 has a hook 10a which engages said bent portion 7b and has a cam surface 10b which is urged by the roller 4i of the aforesaid control lever 4, and supports a roller 10d on its supporting shaft 10c. Numeral 13 represents a holding lever which is mounted on a shaft 14 and is urged to rotate clockwise by a spring 15. This lever 13 has an arm 13a which is urged by the pin 4f of said control lever 4 and has another arm 13b. Numeral 16 represents a magnet lever which is mounted on said shaft 14. This magnet lever 16 has, extending therefrom, a pin 16a which engages said arm 13b and has a hook 16b, a pole-contacting portion 16c and an arm 16d. Numeral 17 represents a spring which is applied between the holding lever 13 and the magnet lever 16 and urges the arm 13b and the pin 16a into pressure contact with each other and acts to urge the lever 16 to rotate counter-clockwise. Numeral 18 represents a rear blade release lever which is mounted on the shaft 14 and is urged to rotate clockwise by a spring 19. This lever 18 has a bent portion 18a which is engageable with the arm 16d of the magnet lever 16 and has another bent portion 18b. Numeral 20 represents a rear blade driving lever which is mounted on a shaft 21 and is urged to rotate clockwise by a spring 22. This lever 20 has a hook 20a which is engageable with the bent portion 18b and also has a shaft 20b which supports a roller 20c which, in turn, is able to contact the end surface 4e of the control lever 4 and has another supporting shaft 20d for supporting a roller 20e. Numeral 23 represents a signaling lever mounted on a shaft 24 and is urged to rotate counter-clockwise by a spring 25 and is assigned to indicate that the exposure time has been controlled by a mechanical control means. This lever 23 has a pin 23 a which is controlled of its action by the cam surface 4b, the outer peripheral surface 4c and the inclined surface 4d of the control lever 4 and has another pin 23b, and further has an arm 23c and a signaling arm 23d. Numeral 26 represents a mechanical exposure control lever which is mounted on the shaft 24 and has a lug 26a which engages the pin 23b and a bent portion 26b which is engageable with the hook 16b of the magnet lever 16 and has another bent portion 26c. Numeral 27 represents a spring which is applied between the signaling lever 23 and the control lever 26. This spring 27 brings the pin 23b and said lug 26a into pressure-contact with each other, and acts to urge the control lever 26 to rotate counter-clockwise. Numeral 28 represents a lever for locking the signaling lever and is mounted on the shaft 14 and is urged to rotate counter-clockwise by a spring 29. This lever 28 has an arm 28a which engages the pin 16a of the magnet lever 16 and which is able to contact the end surface 23c' of the arm 23c of said signaling lever 23. This lever 28 further has a hook 28b which is engageable with the arm 23c. Numeral 30 represents a release lever which is mounted on the shaft 11 and is urged to rotate counter-clockwise by a spring 31. This release lever has an arm 30a which is engageabele with the roller 10d of the front blade driving lever 10 and has a bent portion 30b which is engageable with bent portion 26 c of the control lever 26. Numeral 32 represents an iron core of an electromagnet which is connected to a known automatic exposure control circuit not shown. This core is positioned to face the pole-contacting portion 16c of the magnet lever 16.

It should be understood that the roller 10d of the front blade driving lever 10 is associated with a group of front blades not shown, whereas the roller 20e of the rear blade driving lever 20 is associated with a group of rear blades not shown. The constructions and the actions of these kinds of blades are well known from, for example, the U.S. Pat. No. 3,628,438 specification, and accordingly their explanation is omitted.

Next, description will be directed to the action of the shutter of the present invention firstly with respect to an instance where the voltage of the battery is above a predetermined value.

In the cocked state of the mechanism shown in FIG. 1, let us assume that a mirror-driving mechanism of a camera not shown is operated by a camera release button not shown either, to cause the release plate 1 to rotate counter-clockwise against the tension of the spring 3 in the final stage of its action of turning up the mirror in a leap. Whereupon, the bent portion 1a of the release plate 1 is disengaged from the hook 4a. Accordingly, the control lever 4 is caused to rotate clockwise by the tension of the spring 6.

As this control lever 4 rotates clockwise, it causes the power switch of the known automatic exposure control circuit not shown to close. At the same time, this lever 4 pushes the pin 23a by its cam surface 4b to cause the signaling lever 23 to rotate clockwise against the tension of the spring 25, thereby placing, temporarily, the pin 23b of this lever 23 onto the outer peripheral surface 4c. As a result, due to the clockwise rotation of the signaling lever 23, its arm 23c is brought into the position at which it faces and is engageable with the hook 28b of the lever 28 assigned to lock the signaling lever. The control lever 26, on the other hand, due to the clockwise rotation of the signaling lever 23, is caused to rotate clockwise by the tension of the spring 27, so that its bent portion 26b enters in the sphere of motion of the hook 16b of the magnet lever 16 to be engageable with this hook 16b.

Then, the pin 4f pushes the arm 13a of the holding lever 13 to cause this holding lever 13 to rotate counter-clockwise against the tension of the spring 15. During this part of motion, the magnet lever 16 tends to follow the motion of the holding lever 13 as the spring 17 which is applied between the holding lever 13 and the magnet lever 16 is charged. Since, however, the voltage of the battery is above the predetermined level and the electromagnet is sufficiently energized, said magnet lever 16 is attracted to this core 32 and is retained in its position shown in FIG. 1. Accordingly, the lever 28 for locking the signal lever also is held in its position shown in FIG. 1.

As the outer peripheral surface 4c has passed the pin 23a, the signaling lever 23 is rotated counter-clockwise counter-clockwise the by of the spring 25 since the arm 23c of the signaling lever 23 is not engaged by the hook 28b of the lever 28 assigned for locking the signaling lever and it returns to the positon shown in FIG. 1. Also, the mechanical exposure control lever 26 is caused to return to the position shown in FIG. 1 as its lug 26a is pushed by the pin 23b and is rotated counter-clockwise, without the bent portion 26b engaging the hook 16b of the magnet lever 16.

Thereafter, the pin 4g pushes the arm 7a to cause the front blade release lever 7 to rotate clockwise against the tension of the spring 9 to thereby disengage the bent portion 7b from the hook 10a. Accordingly, the front blade driving lever 10 is rotated clockwise by the tension of the spring 12 to open the group of front blades, not shown, by the roller 10d. At the same time that this group of front blades is opened, the automatic exposure control circuit not shown is actuated to start the counting of the exposure time. When the electromagnet is deenergized at the end of lapse of a predetermined time as a result of said counting, the magnet lever 16 is rotated counter-clockwise by the tension of the already charged spring 17, so that the arm 16d of this magnet lever 16 pushes the bent portion 18a to cause the rear blade release lever 18 to rotate counter-clockwise against the tension of the spring 19, whereby disengaging the bent portion 18b from the hook 20a. As a result, the rear blade driving lever 20 is rotated clockwise by the tension of the spring 22, whereby its roller 20e causes the group of rear blades not shown to close.

During this part of operation, the lever 28 for locking the signaling lever is caused to rotate counter-clockwise by the tension of the spring 29, following the displacement of the pin 16a due to the counter-clockwise rotation of the magnet lever 16. It should be understood that the amount of this counter-clockwise rotation is very small because of the fact that the arm 28a is brought into contact with the end surface 23c' of the signaling lever 23 which is positioned with a small distance from said arm 28a.

On the other hand, the release lever 30 is pushed at its arm 30a by the roller 10d in the final part of clockwise rotation of the front blade driving lever 10, and accordingly said release lever 30 is rotated clockwise against the tension of the spring 31. At this part of operation, the control lever 26 has already returned to its position shown in FIG. 1. Therefore, the bent portion 30b only lightly touches the bent portion 26c and will never cause the control lever 26 to rotate counter-clockwise.

With the foregoing actions of the respective component parts, the opening and closing actions of the shutter blades are completed. This state of completion of actions is shown in FIG. 2.

Next, the cocking action of the shutter described above will be explained.

The control lever 4 is rotated counter-clockwise against the tension of the spring 6 to cause the hook 4a of said lever to engage the bent portion 1a of the release plate 1. With this, the cocking action of this shutter completes.

Figure 2:
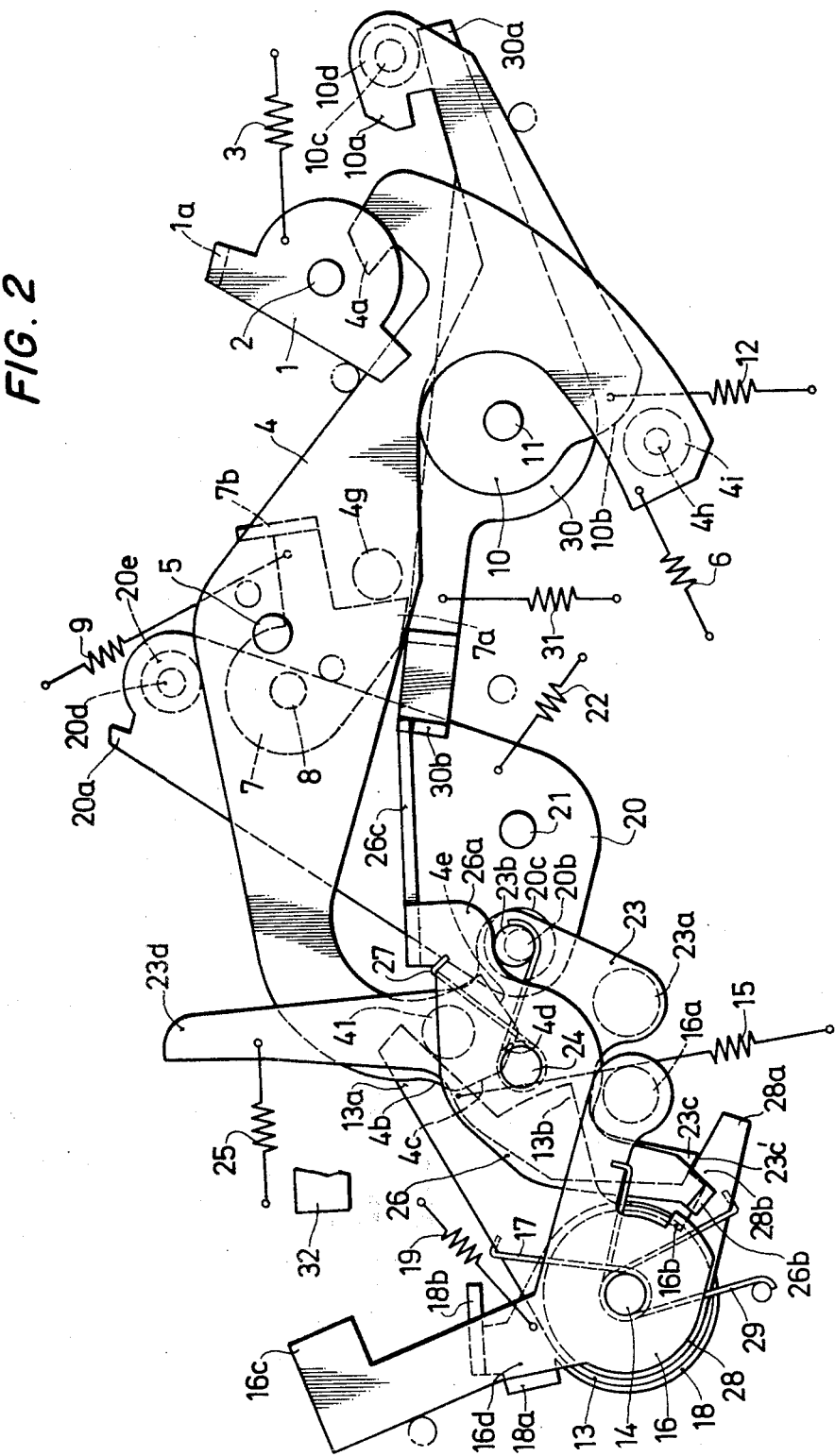
FIG. 2 is a plan view of the essential portion of the shutter mechanism of FIG. 1, showing its state of having completed an exposure operation.

More specifically, as the control lever 4 is rotated counter-clockwise from its position shown in FIG. 2, the roller 4i pushes the cam surface 10b so that the front blade driving lever 10 is caused to rotate counter-clockwise against the tension of the spring 12. Along with this, the front blade release lever 7 follows the motion of the pin 4g, causing its bent portion 7b to engage the hook 10a, whereby causing the group of front blades not shown to close. On the other hand, the release lever 30 is rotated counter-clockwise by the tension of the spring 31 in accordance with the displacement of the roller 10d.

Also, due to the displacement of the pin 4f, the holding lever 13 makes a clockwise rotation by being pulled by the spring 15. As a result, the arm 13b of this holding lever pushes the pin 16a to cause the magnet lever 16 to rotate clockwise until its pole-contacting portion 16c contacts the iron core 32. The lever 28 for locking the signaling lever, on the other hand, is caused to make a clockwise rotation against the tension of the spring 29 as the arm 28a of the lever 28 is pushed by the pin 16a in the final part of the clockwise rotation of the magnet lever 16, thereby forming a small gap between the arm 28a and the end surface 23c' of the signaling lever 23.

Also, the pin 23a is pushed successively by the inclined surface 4d, the outer peripheral surface 4c and the cam surface 4b, so that the signaling lever 23 is caused to make a clockwise rotation against the force of the spring 25. However, when said cam surface 4b has passed the pin 23a, said signaling lever 23 is again rotated counter-clockwise by the tension of the spring 25, thereby returning to its position shown in FIG. 1. The mechanical exposure control lever 26, on the other hand, follows the reciprocal rotary motion of the signaling lever 23.

Furthermore, the end surface 4e pushes the roller 20c. Accordingly, the rear blade driving lever 20 is caused to rotate counter-clockwise against the force for the spring 22. Whereby, the hook 20a of this lever 20 is caused to engage the bent portion 18b of the rear blade release lever 18 which is rotated clockwise by the tension of the spring 19 as this lever 18 follows the clockwise returning rotary motion of the magnet lever 16.

With the foregoing actions of the parts, all of these parts return to their state shown in FIG. 1, and the cocking action of the shutter completes.

Next, discussion will be directed to an instance of the shutter wherein the voltage of the battery has dropped below a predetermined level and wherein accordingly the magnet lever 16 cannot be attracted to the iron core 32 and not retained there even when the electromagnet is energized.

As stated previously in the explanation of functions made by referring to FIG. 1, let us now assume that the holding lever 13 is rotated counter-clockwise. Since the magnet lever 16 is not attracted to the iron core 32, this magnet lever 16 follows the counter-clockwise rotation of the holding lever 13 by the tension of the spring 17 applied between the magnet lever 16 and the holding lever 13 and its hook 16b will eventually engage the bent portion 26b of the control lever 26. Due to this engagement, the magnet lever 16 is caused to halt. During this part of operation, the arm 16 has not yet advanced to such a position as to push the bent portion 18a of the rear blade release lever 18.

The lever 28 for locking the signaling lever, on the other hand, makes a counter-clockwise rotation by the tension of the spring 29, following said counter-clockwise rotation of the magnet lever 16, and as a result the hook 28b of said lever 28 engages the arm 23c of the signaling lever 23.

Figure 3:
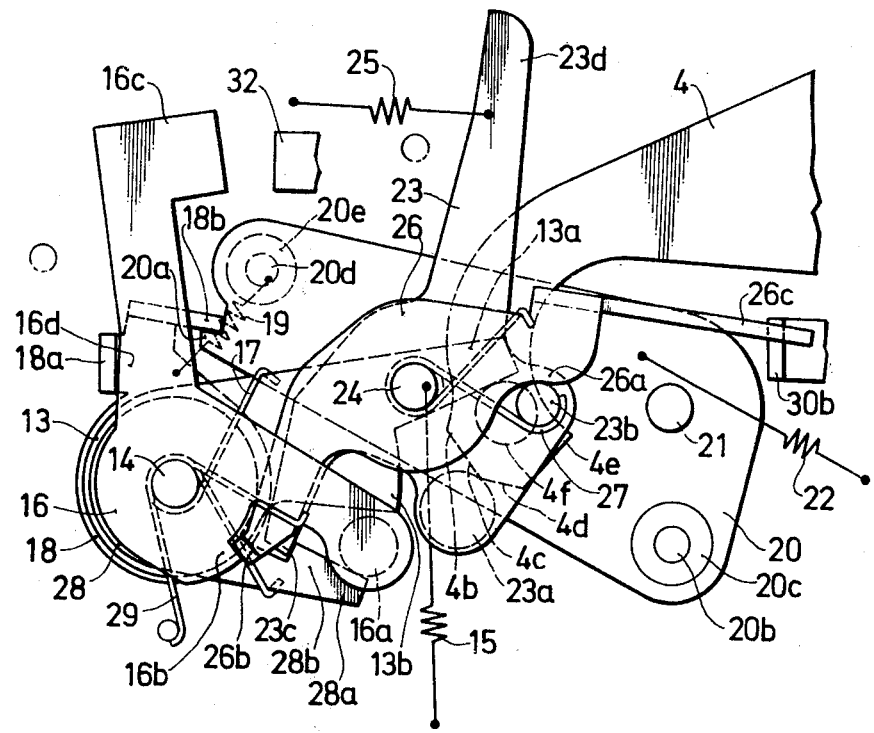
FIG. 3 is a plan view of a portion of the shutter mechanism, showing its state at the time of a shutter release in case an exposure is carried out at a specific shutter speed.

The positions of these members are shown in FIG. 3.

Thereafter, after the outer peripheral surface 4c of the control lever 4 has passed the pin 23a, the signaling lever 23 is still unable to make a counter-clockwise rotation, since the arm 23c of the signaling lever 23 is in engagement with the hook 28b of the lever 28 assigned for locking the signaling lever. Accordingly, the mechanical exposure control lever 26 is urged by the spring 27 in the direction in which its bent portion 26b engages the hook 16b of the magnet lever 16. Also, the bent portion 26c is held in its state of being engaged by the bent portion 30b of the release lever 30.

In this state, the bent portion 30b of the release lever 30 pushes the bent portion 26c when said release lever 30 is rotated clockwise by the front blade driving lever 10, causing the control lever 26 to make a counter-clockwise rotation against the force of the spring 27, whereby disengaging the bent portion 26b from the hook 16b. Accordingly, the magnet lever 16 is now in the state of being able to rotate counter-clockwise. The subsequent closing actions are just as stated previously, and thus the group of rear blades not shown is caused to close.

Figure 4:
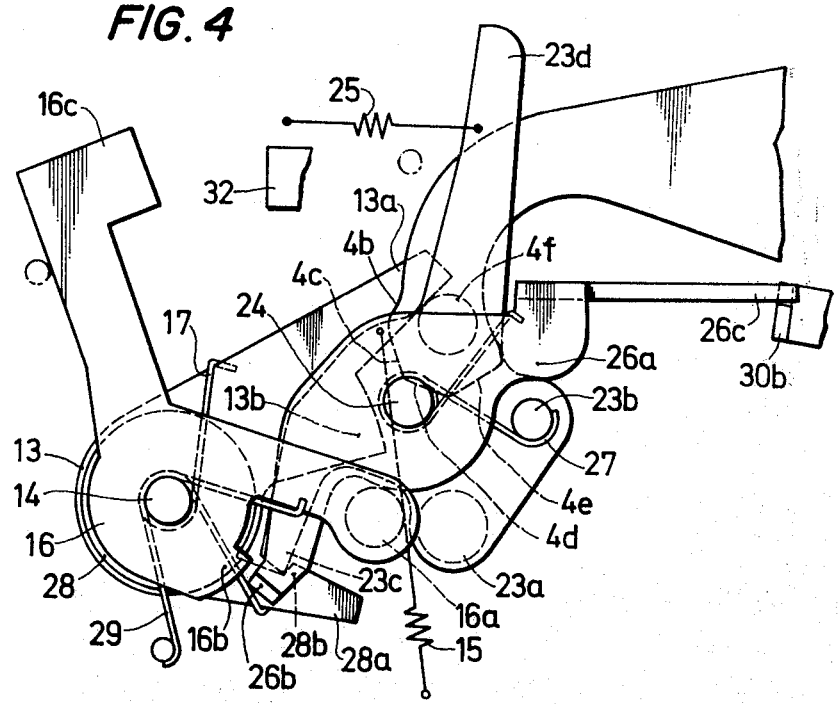
FIG. 4 is a plan view of a portion of the shutter mechanism, showing its state at the time of completion of an exposure motion in case an exposure is carried out at a secific shutter speed.

This mode of operation is shown in FIG. 4. As will be clear from the foregoing explanation, the exposure time in this instance, basically, is determined by the length of time from the commencement of clockwise rotation of the front blade driving lever 10 till this lever 10 hits the release lever 30.

In this part of operation, the signaling lever 23 is prompted to make a counter-clockwise rotation by the force of the springs 25 and 27. This, however, is not materialized since the arm 23c of the signaling lever 23 is locked by the hook 28b of the lever 28 assigned for locking the signaling lever. The signaling arm 23d of the lever 23 is retained in the position of having been rotated to the right side. This signaling arm 23d functions in the manner as stated below.

When the signaling arm 23d has been moved from its position shown in FIG. 1 to the position shown in FIG. 3, this arm or some other interlocking member is caused to enter in the optical system of the finder of the camera not shown, or mirror not shown is held in its leaped-up state by a member interlocked with said signaling arm 23d to thereby keep the interior of the finder of the camera in a real dark condition. Thus, the photographer will be given the signal that the voltage of the battery has dropped below the predetermined level and that the exposure has been carried out at a mechanically controlled specific shutter speed.

It should be understood also that when the magnet lever 16 is rotated clockwise in accordance with the aforesaid cocking operation, the arm 28a is pushed by the pin 16a during the course of this clockwise rotation of the lever 16. As a result, the lever 28 for locking the signaling lever is caused to make a clockwise rotation against the force of the spring 29 and accordingly the hook 28b of this lever 28 is disengaged from the arm 23c. Consequently, the signaling lever 23 is rotated counter-clockwise by the tension of the springs 25 and 27. As a result, either the indicator is caused to retreat from the optical system of the finder, or the mirror is returned to its normal position which is the position at which the light rays that have passed through the photographying lens are reflected.

Now, it is clear that the signaling lever 23 returns to its position shown in FIG. 1 as a result of the shutter cocking operation as stated above. However, in the case of a camera designed to be of the type that when the signaling lever 23 is in the position shown in FIG. 4, the mirror is held in its leaped-up position, there will arise the inconvenience that the mirror will not return to its normal position unless the shutter is cocked. In order to eliminate this inconvenience, it is only necessary to provide a member which can cause the lever 28 assigned for locking the signaling lever to make a clockwise rotation by manual operation.

I claim:
1. An electronic shutter for cameras comprising:
   a control lever adapted to be relieved of its locked state by a shutter release operation,
   a front blade release lever engageable with said control lever and rotated by the motion of said control lever,
   a front blade driving lever engageable with said front blade release lever and released by the motion of said front blade release lever,
   a holding lever engageable with said control lever and rotated by the motion of said control lever;
   a magnet lever engageable with said holding lever and rotatable by following the rotation of said holding lever,
   an electromagnet positioned adjacent to said magnet lever and capable of attracting said magnet lever thereto,
   a rear blade release lever engageable with said magnet lever and rotated by said magnet lever in the final stage of motion of this magnet lever,
   a rear blade driving lever engageable with said rear blade release lever and released by the motion of said rear blade release lever,
   a signaling lever engageable with said control lever and pivotable by the motion of said control lever, to indicate that the exposure time has been mechanically controlled,
   a lever engageable with said signaling lever and with said magnet lever, to lock said signaling lever in its pivoted position,
   a mechanical exposure control lever urged to engage with said signaling lever and capable of entering in the path of motion of said magnet lever, and
   a release lever engageable with said front blade driving lever and with said mechanical exposure control lever,
   said shutter being arranged so that only when said magnet lever is not attracted to said electromagnet at the time of a shutter release, said magnet lever is locked by said mechanical exposure control lever and at the same time said signaling lever is locked by said signal lever locking lever in its pivoted position, whereby the state of locking of said magnet lever and said signaling lever is released when said mechanical exposure control lever is moved by said release lever.

* * * * *